P. BOOTH.
APPARATUS FOR MAKING WIRE SIEVES OR FLOORS.
APPLICATION FILED NOV. 2, 1921.

1,407,184.

Patented Feb. 21, 1922.
3 SHEETS—SHEET 1.

Inventor.
Percy Booth
By Dodge and Sons
Associate Attorneys.

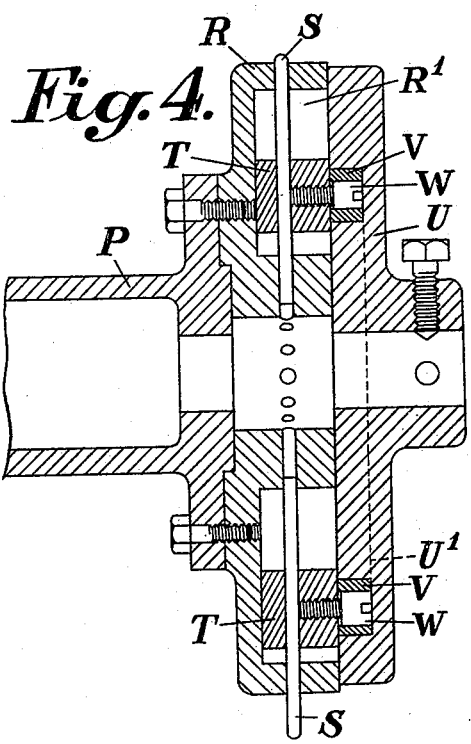
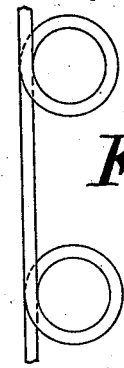
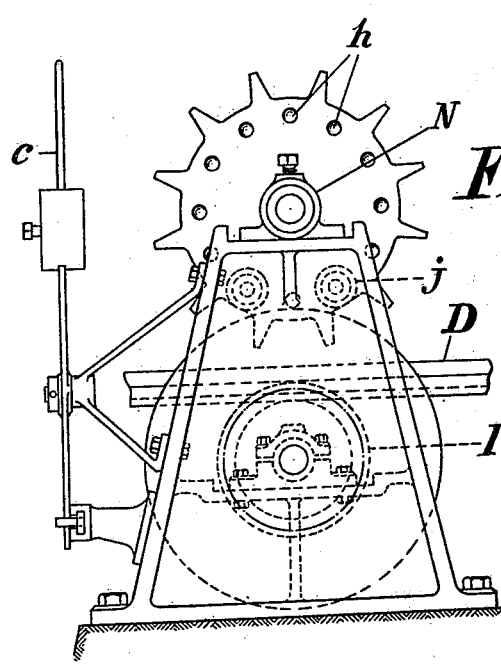

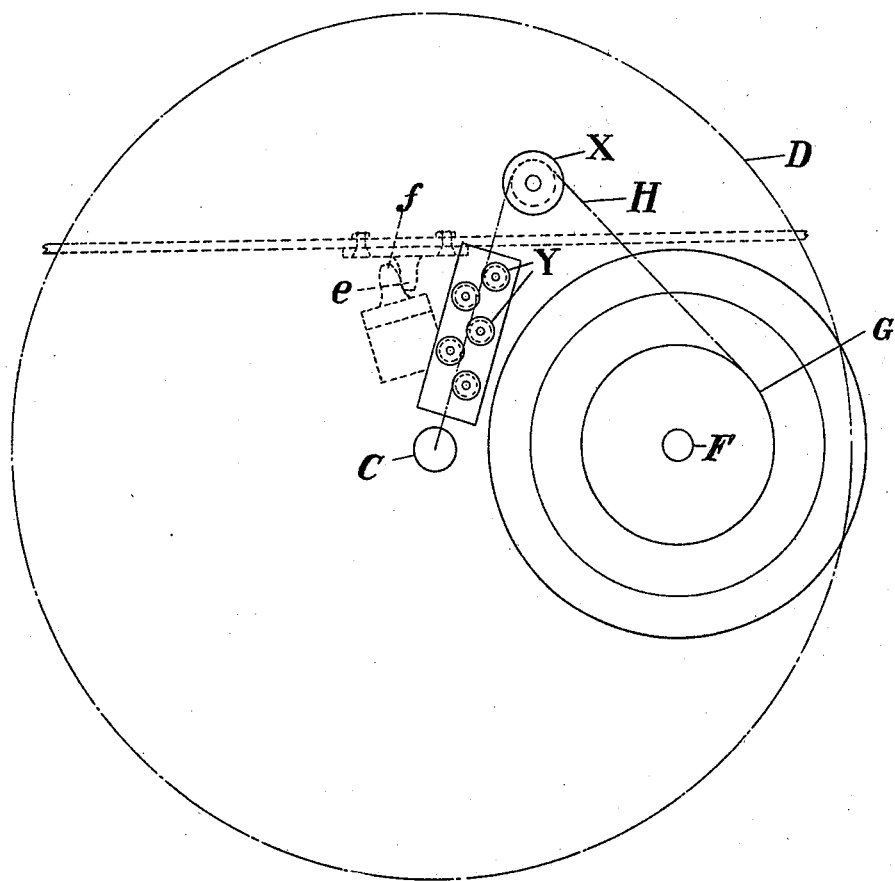

UNITED STATES PATENT OFFICE.

PERCY BOOTH, OF WARRINGTON, ENGLAND.

APPARATUS FOR MAKING WIRE SIEVES OR FLOORS.

1,407,184. Specification of Letters Patent. Patented Feb. 21, 1922.

Application filed November 2, 1921. Serial No. 512,313.

*To all whom it may concern:*

Be it known that I, PERCY BOOTH, subject of the King of Great Britain, residing in Stockton Heath, Warrington, in the county of Lancaster and Kingdom of England, have invented certain new and useful Improvements in Apparatus for Making Wire Sieves or Floors, (for which I have filed an application in England, No. 29708, October 21, 1920,) of which the following is a specification.

This invention has for its object machinery whereby round or other shaped wire can be formed into continuous straight or more or less zig-zag lengths of a straight bar, and a circle, and so on alternately, whereby a wire can be formed flat on one side, but having a circular loop every few inches on the other side. A floor or sieve is then formed by passing a round wire through each set of circles and riveting them tight. If this is on the lower side of the sieve or floor, the upper surface of the floor is then flat and very firm. In a good strong sieve the wire might be originally round wire, afterwards flattened out, and about one-sixteenth to one-eighth of an inch in diameter, but it varies with the different kinds of sieve. Sieves made on this plan however are old and I make no claim for them, but solely to the machinery for forming them which I will now describe and illustrate.

The invention will be understood having reference to the accompanying drawings in which:—

Fig. 1 is a front elevation of my machine and

Fig. 2 an end elevation.

Fig. 3 is a plan of part of the machine and

Fig. 4 is an enlarged detail of the radial pin wheel and eccentric.

Fig. 5 shows a single line of loops formed on one side.

Figure 1:
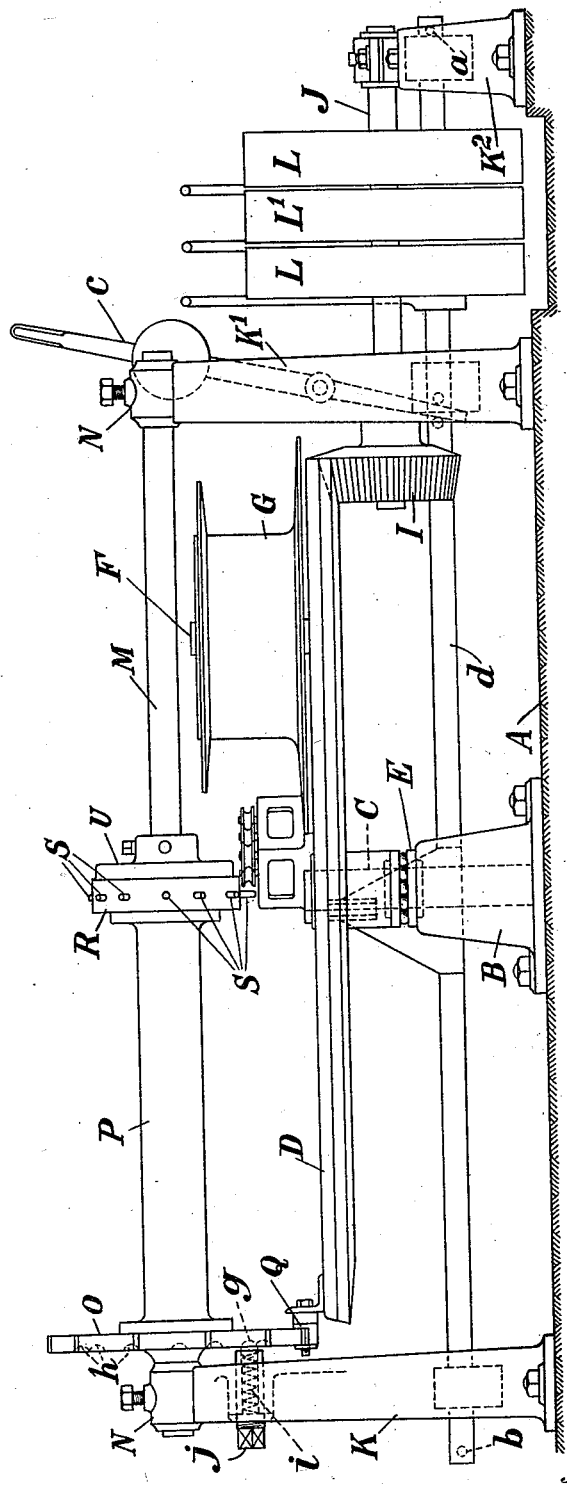

Fig. 6 loops alternately formed.

Referring now to Figs. 1 and 2, A is a strong floor or foundation to which I fix a footstep bracket B for vertical shaft C carrying a bevel wheel D of considerable diameter the thrust of which is taken by a ball thrust bearing E. Vertically up through one point of this bevel wheel I place a spindle stud F firmly bolted to the wheel D, and on this stud F, I place a spool G carrying the wire H. A small bevel pinion I working into the large bevel wheel D is carried by a shaft J through bearings and pedestal brackets K¹ and K² on the same foundation A and this shaft carries driving fast and loose pulleys L and L'.

On the more central pedestal bracket K' that carries this driving shaft I fix a stationary shaft M. This shaft is carried by another pedestal bracket K and eye brackets N, the axis of this shaft passing over the vertical centre line of the wheel D. This shaft M carries a star wheel O and a long sleeve P freely revoluble on the fixed shaft M preferably at the end furthest from the driving shaft J and bolted to the star wheel O. On the large bevel wheel D, I mount a roller Q at one point so that whenever the wheel revolves one revolution the roller will strike the star wheel O and move it forward one tooth. On the sleeve P, I place a wheel R carrying the same number of radial pins S, as there are teeth in the star wheel O. I do not confine myself to the star wheel as this can be replaced by other mechanism.

The enlarged view Fig. 4 is now specially referred to. In this view, one set of pins only is shown forming the wire as in Fig. 5, it is easily understood that another row of pins could be employed and this second row of pins could be uniformly staggered from the first set forming the wire as in Fig. 6. These pins S slide in their holes and the wheel R which carries them is fitted with a broad internal groove R' in which a block T round each pin slides or travels freely. Attached to the stationary shaft M and adjacent to the main pin wheel R is a vertical crown wheel U having a circular eccentric slot U' in which run rollers V revolving on set screws W of the block T. This set screw may form a double purpose of fixing the block to the pin, and of carrying the roller V. The slot in the outer wheel being eccentric, as the sleeve and the wheels revolve, the pins are drawn down so that at the bottom they project considerably and at the top they are enclosed in the wheel. Not far from the pin wheel R and from the spool G, I place a guide roll X and then a series of guide rolls Y Fig. 3 so arranged that when the wire is passed along, each guide roll bends it a little, consequently these guide rolls hold it firmly, and act as a brake on it. The end is looped round pins at the bottom.

Referring again to Figs. 1 and 2, L, L' are ordinary fast and loose pulleys, *c* a weight lever which confined by the steps *a* and *b* in the belt fork bar *d* holds the belts when thrown over. The belts are forcibly moved over by a tappet *e* secured to the fork bar *d*, and the tooth *f* on the under side of the bevel wheel D. This fast and loose pulley device is mechanically operated at every revolution of the main wheel D if the coiling of the wire round the pins is reversed, but where the wire is coiled always to the right or always to the left the belt motion can be dispensed with.

The star and pin wheels are held in position between each revolution of the bevel wheel by two balls *g* being forced into recesses *h* by helical springs *i* working in hollow set pins *j* mounted in the pedestal bracket K.

Mode of action is as follows:—A spool of wire being placed in the machine, and the end of the wire H after passing through the friction device X Y is looped round two or more of the pins S. The machine is now set going. The star wheel C at each revolution moves the pin wheel R the distance of one pin or one tooth of the star. In the meantime the spool G has been carried round one revolution, consequently the wire has made a complete revolution round the lowermost pin, and the star wheel operating causes the pin wheel to move forward the distance between the two pins. The wheel revolving round a second time again tightly winds another revolution of wire on the next pin, when the star wheel again moving a third pin comes into position, and this goes on until a long wire having loops say every two or more inches is formed. This wire can at any time afterwards be hammered or formed or rolled flat or wedge shape as the case may be, I declare that what I claim is:—

1. A machine for manufacturing wire having loops at spaced intervals thereon, comprising in combination a revolving disc; means for carrying a spool of wire eccentrically on said disc; pin-carrying means rotated step-by-step and about which the revolving disc moves; a plurality of radially movable pins carried by said pin-carrying means; intermittent motion gear actuated by the revolving disc for rotating the pin-carrying means a fraction of a revolution at each revolution of the revolving disc; means for guiding and tensioning the wire on its way to the pins, and means for projecting each pin into a position for the wire to be looped round it, by the revolution of the revolving disc, and retracting the pin from the loop at a predetermined point in the revolution.

2. A machine for manufacturing wire having loops at spaced intervals thereon, comprising in combination a revolving disc; means for carrying a spool of wire eccentrically on said disc; pin-carrying means rotated step-by-step and about which the revolving disc moves; a plurality of radially movable pins carried by said pin-carrying means; intermittent motion gear actuated by the revolving disc for rotating the pin-carrying means a fraction of a revolution at each revolution of the revolving disc; means for guiding and tensioning the wire on its way to the pins, and means for projecting each pin into a position for the wire to be looped round it by the revolution of the revolving disc, and retracting the pin from the loop at a predetermined point in the revolution; and means for reversing the direction of motion of the revolving disc after each revolution thereof.

3. A machine for manufacturing wire having loops at spaced intervals thereon, comprising in combination a revolving disc; means for carrying a spool of wire eccentrically on said disc; pin-carrying means rotated step-by-step and about which the revolving disc moves; a plurality of radially movable pins carried by said pin-carrying means; intermittent motion gear actuated by the revolving disc for rotating the pin-carrying means a fraction of a revolution at each revolution of the revolving disc; means for guiding and tensioning the wire on its way to the pins, and means for projecting each pin into a position for the wire to be looped round it by the revolution of the revolving disc, and retracting the pin from the loop at a predetermined point in the revolution; and means for locking the intermittent motion gear and pin-carrying means during the revolution of the revolving disc.

4. A machine for manufacturing wire having loops at spaced intervals thereon, comprising in combination, a revolving disc; means for carrying a spool of wire eccentrically on said disc; a fixed shaft; a starwheel carried by a sleeve revoluble on said shaft, and adapted to be moved forward one tooth by the revolving disc at each complete revolution of the latter; a pin-carrying wheel on said sleeve revoluble step-by-step with the starwheel; a plurality of radially movable pins carried by said pin-wheel, means for imparting a radial outward and inward movement to said pins so as to move each pin into a position for the wire to be looped round it by the revolution of the revolving disc and retract the pin from the loop at a predetermined point in the revolution; means for guiding and tensioning the wire on its way to said pins; and means for locking the star-wheel and pin-carrying wheel during the revolution of the revolving disc.

5. A machine for manufacturing wire having loops at spaced intervals thereon, comprising in combination a revolving disc; means for carrying a spool of wire eccentrically on said disc; a fixed shaft; a starwheel carried by a sleeve revoluble on said shaft, and adapted to be moved forward one tooth by the revolving disc at each complete revolution of the latter; a pin-carrying wheel on said sleeve revoluble step-by-step with the starwheel; a plurality of radially movable pins carried by said pin wheel means for imparting a radial outward and inward movement to said pins so as to move each pin into a position for the wire to be looped round it by the revolution of the revolving disc and retract the pin from the loop at a predetermined point in the revolution; means for guiding and tensioning the wire on its way to said pins; means for locking the star wheel and pin-carrying wheel during the revolution of the revolving disc, and means for reversing the direction of motion of said disc after each revolution thereof.

6. A machine for manufacturing wire having loops at spaced intervals thereon, comprising in combination a revolving disc; means for carrying a spool of wire eccentrically on said disc; a fixed shaft; a starwheel carried by a sleeve revoluble on said shaft, and adapted to be moved forward one tooth by the revolving disc at each complete revolution of the latter; a pin-carrying wheel on said sleeve revoluble step-by-step with the starwheel; a plurality of pins each slidable radially on a sector-block in the interior of said pin-wheel; a crown-wheel attached to the stationary shaft and having an eccentric slot in one face; rollers carried by the sector-blocks running in the eccentric slot, whereby as the pin-carrying wheel revolves the pins are radially protruded beyond the periphery of said wheel or withdrawn means for guiding and tensioning the wire on its way from the spool to said pins; and means for locking the starwheel and pin-wheel during the revolution of the revolving disc.

7. A machine for manufacturing wire having loops at spaced intervals thereon, comprising in combination, a revolving disc; means for carrying a spool of wire eccentrically on said disc; a fixed shaft; a starwheel carried by a sleeve revoluble on said shaft, and adapted to be moved forward one tooth by the revolving disc at each complete revolution of the latter; a pin-carrying wheel on said sleeve revoluble step-by-step with the starwheel; a plurality of radially movable pins carried by said pin-wheel means for imparting a radial outward and inward movement to said pins so as to move each pin into a position for the wire to be looped round it by the revolution of the revolving disc and retract the pin from the loop at a predetermined point in the revolution; and means for guiding and tensioning the wire in its way to said pins comprising a plurality of staggered guide rollers between which the wire is passed; and means for locking the star wheel and pin-wheel during the revolution of the disc.

8. A machine for manufacturing wire having loops at spaced intervals thereon, comprising in combination, a revolving disc; means for carrying a spool of wire eccentrically on said disc; a fixed shaft; a starwheel carried by a sleeve revoluble on said shaft, and adapted to be moved forward one tooth by the revolving disc at each complete revolution of the latter; a pin-carrying wheel on said sleeve revoluble step-by-step with the starwheel; a plurality of radially movable pins carried by said pin-wheel; means for imparting a radial outward and inward movement to said pins so as to move each pin into a position for the wire to be looped round it by the revolution of the revolving disc and retract the pin from the loop at a predetermined point in the revolution; and means for guiding and tensioning the wire on its way to said pins comprising a plurality of staggered guide rollers between which the wire is passed; and means for locking the starwheel comprising spring-pressed balls engaging recesses on the face of said wheel.

9. A machine for manufacturing wire having loops at spaced intervals thereon, comprising in combination, a revolving disc; means for carrying a spool of wire eccentrically on said disc; a fixed shaft; a starwheel carried by a sleeve revoluble on said shaft, and adapted to be moved forward one tooth by the revolving disc at each complete revolution of the latter; a pin-carrying wheel on said sleeve revoluble step-by-step with the starwheel; a plurality of radially movable pins carried by said pin-wheel, means for imparting a radial outward and inward movement to said pins so as to move each pin into a position for the wire to be looped round it by the revolution of the revolving disc and retract the pin from the loop at a predetermined point in the revolution; and means for guiding and tensioning the wire on its way to said pins comprising a plurality of staggered guide rollers between which the wire is passed; and means for locking the starwheel comprising spring-pressed balls engaging recesses on the face of said wheel; and means carried by the revolving disc for reversing the direction of motion of said disc after each revolution.

10. A machine for manufacturing wire having loops at spaced intervals thereon, comprising in combination a revolving disc; means for carrying a spool of wire eccentrically on said disc; a fixed shaft; a starwheel carried by a sleeve revoluble on said shaft, and adapted to be moved forward one tooth by the revolving disc at each complete revolution of the latter; a pin-carrying wheel on said sleeve revoluble step-by-step with the starwheel; a plurality of pins each slidable radially on a sector-block in the interior of said pin-wheel; a crown-wheel attached to the stationary shaft and having an eccentric slot in one face; rollers carried by the sector-blocks running in the eccentric slot, whereby as the pin-carrying wheel revolves the pins are radially protruded beyond the periphery of said wheel or withdrawn; means for guiding and tensioning the wire on its way to said pins comprising a plurality of staggered guide rollers between which the wire passes; and spring-actuated means for locking the starwheel during the revolution of the revolving disc.

11. A machine for manufacturing wire having loops at spaced intervals thereon, comprising in combination a revolving disc; means for carrying a spool of wire eccentrically on said disc; a fixed shaft; a starwheel carried by a sleeve revoluble on said shaft, and adapted to be moved forward one tooth by the revolving disc at each complete revolution of the latter; a pin-carrying wheel on said sleeve revoluble step-by-step with the starwheel; a plurality of pins each slidable radially on a sector-block in the interior of said pin-wheel; a crown-wheel attached to the stationary shaft and having an eccentric slot in one face; rollers carried by the sector-blocks running in the eccentric slot, whereby as the pin carrying wheel revolves the pins are radially protruded beyond the periphery of said wheel or withdrawn; means for guiding and tensioning the wire on its way to said pins comprising a plurality of staggered guide rollers between which the wire passes; and spring-actuated means for locking the starwheel during the revolution of the revolving disc; and means for reversing the direction of motion of said disc at each revolution comprising fast-and-loose pulleys, a weighted lever, a longitudinally movable belt-fork bar, a tappet on said bar, and a tooth on the under side of the revolving disc for encountering the said tappet.

In witness whereof I have hereunto signed my name this 24th day of October, 1921, in the presence of two subscribing witnesses.

PERCY BOOTH.

Witnesses:
Wm. P. Thompson,
John McLachlan.